United States Patent Office 3,513,202
Patented May 19, 1970

3,513,202
ACETYLENIC KETONES AND USE AS A PARASITICIDE
Roland Chretien, Paris, and Georges Wetroff, Le Thillay, France, assignors to Produits Chimiques Pechiney-Saint-Gobain, Neuilly-sur-Seine, France
No Drawing. Filed June 24, 1966, Ser. No. 560,085
Claims priority, application France, June 29, 1965, 22,739
Int. Cl. C07c 49/20
U.S. Cl. 260—593             1 Claim

ABSTRACT OF THE DISCLOSURE

A conjugated unsaturated aliphatic ketone having the general formula R—CH=CH—CO—C≡C—R' in which R and R' represent an alkyl group of from 1 to 18 carbon atoms and particularly 2-heptene-5-yne-4-one and the method for the preparation of same and the use of same as a pesticide.

---

This invention relates to ketones in the form of conjugated unsaturated aliphatic ketones having one acetylenic bond and one ethylenic bond, and it relates to the method for producing the same and the use of same as a parasiticide.

In the copending application Ser. No. 534,664, filed Mar. 16, 1966, description is made of ketone compounds having at least one ethylenic bond and at least two acetylenic bonds.

The compound 1-phenyl-2,4-hexadiyn-1-one has previously been prepared. This compound has a relatively low activity towards such fungi as *Aspergillus niger*, *Candida albicans*, *Scopulariopsis brevicaulis* and *Trichophyton interdigitale*. In order to achieve a useful result, it is necessary to make use of such compounds in large amounts.

It is an object of this invention to produce and to provide a method for producing ketone compounds of the type described and it is a related object to produce ketone compounds of the type described which inhibit the growth of parasitic organisms, even when used in low concentrations.

Conjugated unsaturated aliphatic ketones containing one acetylenic bond and one ethylenic bond, produced in accordance with the practice of this invention, have the general formula:

R—CH=CH—CO—C≡C—R' in which R and R' represent alkyl groups containing from 1 to 18 carbon atoms, such as methyl, ethyl, propyl, butyl, isopropyl, pentyl, decyl, octadecyl and the like.

Representative of the more desirable compound included within the formula is 2-heptene-5-yne-4-one having the formula: CH₃—CH=CH—CO—C≡C—CH₃

It has been found that the combination in association of two alkyl radicals with the ketone function and with the acetylenic and ethylenic bonds, confers onto these compounds surprisingly efficient parasiticidal activity.

The described ketones can be obtained by oxidation of the corresponding alcohols by means of conventional oxidizing agents such as chromic anhydride or active manganese dioxide. The corresponding alcohols can be obtained by several methods such as (a) by the reaction of alpha-ethylenic aldehydes on lithium or sodium derivatives of true acetylenes either in liquid ammonia or in other suitable solvent; (b) by the reaction of the alpha-ethylenic aldehydes on the magnesium derivatives of true acetylenes, or (c) by the reaction of vinyl magnesium derivatives on alpha-acetylenic aldehydes.

The conjugated aliphatic monoacetylenic and monoethylenic ketones of this invention, and particularly 2-heptene-5-yne-4-one are active antifungal agents, especially towards *Candida albicans*, *Trichophyton interdigitale*, *Sabouraudites audouini*, *Scopulariopsis brevicaulis*, *Fusarium vasinfectum*, *Cercospora melonis*, *Aspergillus niger* and *Plasmopara viticola*.

The aliphatic ketones of this invention can be used alone or they may be mixed advantageously with known microbicides. They can be formulated for use in a solvent system in which the solvent may be acetone, benzene, chlorobenzene, chloroform and the like. They can be employed for application in the form of a powder, either alone or in admixture with inert carriers such as talcum, sand and kaolin. They may be formulated also into pastes or pomades.

The following examples are given by way of illustration, but not by way of limitation, of the preparation of the compounds of this invention and their use.

EXAMPLE 1

Preparation of 2-heptene-5-yne-4-one

The propyne magnesium derivative is prepared by bubbling propyne, at room temperature, into an ethereal solution of magnesium ethyl bromide which is obtained from 5.5 g. of magnesium, 27.5 g. of ethyl bromide in 200 ml. of anhydrous ether. A reflux condenser, cooled with acetone-Dry Ice, refluxes the propyne while the gaseous ethane is allowed to evolve. When the evolution of ethane ceases the excess propyne is distilled off.

The mixture is then cooled in an ice bath and 14 g. of crotonic aldehyde dissolved in 50 ml. of anhydrous ether are slowly added. It is heated at reflux for one hour, cooled in a salt-ice bath, and the mixture is then hydrolyzed with a saturated solution of ammonium chloride.

It is extracted with ether and the ether solution is washed with water, dried over sodium sulfate and then the ether is distilled off. 9.55 g. of raw 2-heptene-5-yne-4-ol are obtained corresponding to a yield of 43.5% by weight of theory.

The 9.55 g. of the alcohol is dissolved in 20 ml. of acetone and is progressively added to a suspension of 95.5 g. of active MnO₂ in 955 ml. of acetone which has previously been distilled over MnO₄K. The mixture is agitated for 8 hours at room temperature and then filtered. The filtrate is dried over sodium sulfate and the solvent is distilled off.

The liquid residue is purified by evaporation under vacuum. 3.85 g. of analytically pure 2-heptene-5-yne-4-one are obtained, corresponding to a yield of 40% by weight of theory.

EXAMPLE 2

In the preparation of others of the compounds included within the general formula, the corresponding aldehyde is substituted for the crotonic aldehyde in equimolecular proportions, otherwise the steps and conditions for reaction are the same as in Example 1.

For example, in the preparation of 2-octene-5-yne-4-one, the procedure set forth in Example 1 is followed but in which the propyne is replaced with an equivalent amount of butyne.

Others of the ketones can be prepared by the replacement of croton aldehyde in Example 1 with equivalent amounts of other alpha-ethylenic aldehydes.

EXAMPLE 3

The antifungal activity of 2-heptene-5-yne-4-one has been determined on *Candida albicans*, *Scopulariopsis brevicaulis* and *Trichophyton interdigitale*. The culture medium consists of 100 ml. of Sabouraud medium gelosed at 2% and previously sterilized in an autoclave at 110–120° C. for over 20 minutes. At the outlet of the autoclave, 0.5 ml. of acetone containing the active compound in proportions ranging from $\frac{1}{1000}$ to $\frac{1}{100,000}$ part by weight, based upon the culture medium, is added to the medium. The separate compositions are carefully mixed and poured into previously sterilized Petri dishes. A control is prepared of the same Sabouraud medium with .5 ml. of acetone added per 100 ml. of medium.

After cooling, the dishes are implanted with approximately equal quantities of mycelium taken from stock culture. They are put in a dry oven at 28° C. Examination of the Petri dishes is made after 10 days of incubation at this temperature.

As a comparison and better to illustrate the merits of the invention, identical tests were carried out with 1-phenyl-2,4-hexadiyne-1-one as the active ingredient. The minimal concentration of active compound needed completely to inhibit the growth of microorganisms after 10 days of incubation at 28–30° C. was determined and set forth in the following table.

| Parasites | Minimal concentrations of— | |
|---|---|---|
| | 2-heptene-5-yne-4-one | 1-phenyl-2,4-hexadiyne-1-one |
| Candida albicans | 1/4,000 | 1/2,000 |
| Scopulariopsis brevicaulis | 1/20,000 | 1/16,000 |
| Trichophyton interdigitale | 1/40,000 | 1/20,000 |

The foregoing results show that the antifungal activity of 2-heptene-5-yne-4-one is 1.25 to 2 times greater than that of 1-phenyl-2,4-hexadiyne-1-one.

It will be understood that changes may be made in the details of formulation and operation as well as in the methods of application without departing from the spirit of the invention, especially as defined in the following claim.

We claim:
1. A parasiticidal or fungicidal agent consisting of the compound heptene-2-yne-one-4.

References Cited

UNITED STATES PATENTS 2,783,258   2/1957   Celmer.

OTHER REFERENCES

Braude et al.: "J. Chem. Soc.," pp. 2078–84 (1951). QD1.C6.

Bowden et al., "J. Chem. Soc.," pp. 39–45 (1946), QD1.C6.

BERNARD HELFIN, Primary Examiner

W. B. LONE, Assistant Examiner

U.S. Cl. X.R.

252—177; 260—596, 638, 999; 424—331